United States Patent
Paya et al.

(10) Patent No.: US 7,634,570 B2
(45) Date of Patent: Dec. 15, 2009

(54) MANAGING STATE INFORMATION ACROSS COMMUNICATION SESSIONS BETWEEN A CLIENT AND A SERVER VIA A STATELESS PROTOCOL

(75) Inventors: Ismail Cem Paya, Seattle, WA (US); Trevin Chow, Bellevue, WA (US); Stephen J. Purpura, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 732 days.

(21) Appl. No.: 10/425,516

(22) Filed: Apr. 29, 2003

(65) Prior Publication Data

US 2004/0181598 A1    Sep. 16, 2004

Related U.S. Application Data

(60) Provisional application No. 60/454,370, filed on Mar. 12, 2003.

(51) Int. Cl.
G06F 15/16    (2006.01)

(52) U.S. Cl. .................................................... 709/227
(58) Field of Classification Search ................... 709/227
See application file for complete search history.

(56) References Cited

U.S. PATENT DOCUMENTS

| | | | |
|---|---|---|---|
| 5,907,621 A | 5/1999 | Bachman et al. | |
| 5,961,601 A | 10/1999 | Iyengar | |
| 6,330,566 B1 | 12/2001 | Durham | |
| 6,385,642 B1 * | 5/2002 | Chlan et al. | 709/203 |
| 6,947,992 B1 * | 9/2005 | Shachor | 709/228 |
| 7,039,946 B1 * | 5/2006 | Binding et al. | 726/3 |
| 2002/0078177 A1 | 6/2002 | Dutta | |
| 2002/0116531 A1 | 8/2002 | Chu | |
| 2002/0143933 A1 | 10/2002 | Hind et al. | |
| 2002/0152239 A1 * | 10/2002 | Bautista-Lloyd et al. | 707/513 |

(Continued)

FOREIGN PATENT DOCUMENTS

GB    2346229 A    8/2000

(Continued)

OTHER PUBLICATIONS

Berghel, "Hijacking the Web," Communications of the ACM, Apr. 2002, pp. 23-27, vol. 45, Issue 4, ACM Press, New York, U.S.A.

(Continued)

*Primary Examiner*—Nathan Flynn
*Assistant Examiner*—Chirag R Patel
(74) *Attorney, Agent, or Firm*—Senniger Powers LLP (57) ABSTRACT

Managing state information across communication sessions between a client and a server via a stateless protocol. The server delivers to the client a cacheable web page with a hyperlink to non-cacheable embedded content. In the hyperlink to the non-cacheable embedded content, the server adds a token or an identifier uniquely associated with the user. When the user obtains embedded content from the cached web page via the hyperlink, the identifier is also sent to the server. Upon receipt of the identifier from the client, the server accesses the stored state information. In this manner, the server manages state information related to the client across communication sessions without the use of cookies as long as the client caches the web page with the unique identifier.

16 Claims, 6 Drawing Sheets

U.S. PATENT DOCUMENTS

| | | | |
|---|---|---|---|
| 2003/0005134 A1 | 1/2003 | Martin et al. | |
| 2003/0187935 A1* | 10/2003 | Agarwalla et al. | 709/206 |
| 2004/0049579 A1* | 3/2004 | Ims et al. | 709/225 |
| 2005/0044168 A1* | 2/2005 | Pang et al. | 709/217 |
| 2007/0277235 A1 | 11/2007 | Barrett et al. | |

FOREIGN PATENT DOCUMENTS

| | | |
|---|---|---|
| JP | 2002-157175 | 5/2002 |
| JP | 2002-190821 | 7/2002 |

OTHER PUBLICATIONS

Reagle et al., "The Platform for Privacy Preferences," Communications of the ACM, Feb. 1999, pp. 48-55, vol. 42, Issue 2, ACM Press, New York, U.S.A.

Anton et al., "Web Caching for Database Applications with Oracle Web Cache," Proceedings of the 2002 ACM International Conference on Management of Data and Symposium on Principles of Database Systems, 2002, pp. 594-599, ACM Press, New York, U.S.A.

Felten et al., "Timing Attacks on Web Privacy," Proceedings of the ACM Conference on Computer and Communications Security, 2000, pp. 25-32, ACM Press, U.S.A.

Kristol, "HTTP State Management Mechanism," Network Working Group, Request for Comnments: 2965, The Internet Society, Oct. 2000, pp. 1-22, U.S.A.

Berghel, "Digital Village: Caustic Cookies," Communications of the ACM, May 2001, pp. 19-22, vol. 44, Issue 5, ACM Press, New York, U.S.A.

Treese, "Putting it Together: Data Collection and Consumer Privacy," netWorker, Dec. 2000, pp. 9-11, vol. 4, Issue 4, ACM Press, New York, U.S.A.

Berghel, "Responsible Web Caching," Communications of the ACM, Sep. 2002, pp. 15-20, vol. 45, Issue 9, ACM Press, New York, U.S.A.

Smith, "FAQ: Web Bugs," Resources, http://www.privacyfoundation.org/resources/webbug.asp, accessed Mar. 18, 2003, 8 pages, Privacy Foundation, U.S.A.

"Meantime: Non-Consensual HTTP User Tracking Using Caches," printed from http://sourcefrog.net/projects/meantime/, Jan. 9, 2001, 5 pages.

Takayo Endo and Atsushi Ryu, "Basics of Session Management, Passing Session IDs and Security," WEB+DB Press, vol. 13, pp. 5-9, Gijutsu-Hyohron Co., Ltd., Feb. 27, 2003 (domestic technology magazine 2004-00354-010). Cited as relating to state information; translation not available.

* cited by examiner

MANAGING STATE INFORMATION ACROSS COMMUNICATION SESSIONS BETWEEN A CLIENT AND A SERVER VIA A STATELESS PROTOCOL

TECHNICAL FIELD

The present invention relates to the field of state management. In particular, this invention relates to using a cache to manage state information across communication sessions between a client and the server via a stateless protocol.

BACKGROUND OF THE INVENTION

Hypertext transfer protocol (HTTP) is a protocol having request-response semantics for transferring web pages from servers to clients. Some communication protocols such as HTTP are intrinsically stateless in that the request-response pattern is self-contained. While such a design allows scaling, it is very difficult to carry on stateful interactions using such protocols as there is no way for the server to correlate one request from a client with future requests from the same client. Further, state-management is necessary for some applications such as electronic commerce. For example, persisting state allows an application to maintain a shopping cart, to recognize a returning customer, and to display localized content. With state management, an application provides for a user to customize the appearance of a web page such that when the user visits the site later, the customized appearance is preserved.

An existing solution for this problem is for the client to store a block of data known as a cookie containing state information generated by a server and sent to the client. Cookies were standardized as Internet Engineering Task Force (IETF) Request for Comments (RFC) 2965. Presently, cookies are widely supported by web browsers and allow a server to store arbitrary state information on the client. However, cookies have historically proven vulnerable to exploits leading to compromise of the information stored in the cookies.

Another existing solution to the state management problem includes embedding compressed or uncompressed state information within a uniform resource locator (URL) used to access a web page (e.g., as a query string). However, due to the nature of the URL syntax, there is a limit to the amount and type of state information that can be embedded within the URL. In addition, the embedded state information typically remains available to only one communication session. Creating another session results in new embedded state information.

Similarly, some existing systems embed a session key or other identifier in the URL and/or within hyperlinks within the delivered web pages. The session key corresponds to state information stored on the client or the server. The existing systems retrieve the stored state information via the session key. However, as with the state information embedded within the URL, the session key and corresponding stored state information are associated with only one communication session.

For these reasons, a system for managing state information across communication sessions between a client and a server via a stateless protocol is desired to address one or more of these and other disadvantages.

SUMMARY OF THE INVENTION

The invention includes managing state information during communication via a stateless protocol. In particular, the invention includes managing state information across communication sessions between a client and a server via a stateless protocol by employing a client-side memory area that stores information that is inaccessible to the server. The invention allows a server-side application to uniquely identify the client without the use of cookies by having the client store a client identifier as information that is inaccessible to the server (e.g., stored in the client browser cache). Any amount and type of state information is available via the client identifier during subsequent communication sessions.

In one embodiment, the invention uses only a browser cache for state management and does not depend on cookies, scripts, or active content. The invention employs a client-side browser cache storing information that is inaccessible to the server and, consequently, more secure than cookies by a large order of magnitude. The server delivers to the client a cacheable web page with a hyperlink to non-cacheable embedded content. In the hyperlink to the non-cacheable embedded content, the server adds a token or an identifier uniquely associated with the client. When the client obtains embedded content referenced from the cached web page via the hyperlink, the identifier is also sent to the server. Upon receipt of the identifier from the client, the server accesses the stored state information. In this manner, as long as the browser caches the web page, the server is able to uniquely identify the client. The server stores state information associated with the identifier, for example, in memory accessible by the server.

In accordance with one aspect of the invention, a method manages state information across a plurality of communication sessions between a client and a server. The client and server are coupled to a data communication network. The client obtains web content from information that is stored in a first memory area. The information is inaccessible to the server. The obtained web content includes a reference to additional content that is stored in a second memory area. The reference includes a client identifier specific to the client. The method includes receiving, at the server, a request from the client for the additional content stored in the second memory area. The received request includes the client identifier. The method includes generating the additional content. The additional content is client-specific. The method also includes accessing a database in response to the received client identifier to manage the state information without the use of cookies.

In accordance with another aspect of the invention, a method manages state information across a plurality of communication sessions between a client and a server coupled to a data communication network. The method includes receiving, at the server, a request from the client for web content accessible by the server. The method also includes generating the client identifier in response to the received request and associating state information related to the received request with the generated client identifier to enable state management. The method also includes storing the state information in a database. The method also includes adding the generated client identifier to a reference within the web content. The reference provides a link to additional content stored in the second memory area. The method also includes delivering, to the client, the web content with the reference having the added client identifier, wherein the client stores, upon receipt, the delivered web content as information in a first memory area. The information that is stored in the first memory area is inaccessible to the server. The method also includes receiving, at the server, another request from the client for the additional content stored in the second memory area. The received other request includes the client identifier. The method includes generating the additional content. The additional content is client-specific. The method also includes accessing the database in response to the received client identifier to manage the state information without the use of cookies.

In accordance with still another aspect of the invention, one or more computer-readable media have computer-executable components for managing state information across a plurality of communication sessions between a client and a server. The client and server are coupled to a data communication network. The client obtains web content from information stored in a first memory area. The information is inaccessible to the server. The obtained web content includes a reference to additional content that is stored in a second memory area. The reference includes a client identifier. The components include an interface component for receiving, at the server, a request from the client for the additional content stored in the second memory area. The received request includes the client identifier. The components also include a profile component for generating the additional content and accessing a database in response to the received client identifier to manage the state information without the use of cookies. The additional content is client-specific.

In accordance with yet another aspect of the invention, a computer-readable medium stores a data structure representing web content customized for a client. The data structure is used in managing state information across a plurality of communication sessions between the client and a server. The client and server are coupled to a data communication network. The data structure includes a first field storing web content. The data structure also includes a second field, within the first field, that stores a reference to additional content. The reference includes a client identifier, wherein the server sends the client the data structure for storage as information in a memory area. The information is inaccessible to the server. The client subsequently requests the additional content from the server via the reference. The server generates the client-specific additional content and associates state information regarding the client with the client identifier received in the request for additional content and stores the associated state information.

In accordance with another aspect of the invention, a method manages state information across a plurality of communication sessions between a client and a server. The client and server are coupled to a data communication network. The client obtains web content from information stored in a client browser cache. The obtained web content includes a reference to additional content hosted by the server. The reference includes a client identifier specific to the client. The method includes receiving, at the server, a request from the client for the additional content hosted by the server, the received request including the client identifier. The method also includes accessing a database in response to the received client identifier to manage the state information.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

According to one embodiment, the invention manages state information across a plurality of communication sessions between the client and the server. In particular, the invention enables state management during communication between a client and a server via a stateless protocol (e.g., see FIG. 3). For example, the invention enables user tracking during client-server communication via a hypertext transfer protocol (HTTP) without the use of cookies. While portions of the description herein are directed to embodiments involving HTTP and web browsing, it will be appreciated by those skilled in the art that the invention is applicable to client-server communications via any communication protocol. Further, while some embodiments of the invention are applicable to protocols that are inherently stateless yet support caching semantics, the invention is operable with protocols that maintain state inherently. Examples of stateful interactions are described below. In addition, the state information may be stored in any memory area or storage area accessible by the server such as a server-side or client-side database.

The HTTP protocol defines rich caching semantics to improve performance and reduce unnecessary traffic. Caching is predicated on the assumption that web content changes only infrequently. This allows clients to locally store copies of frequently used documents and eliminate round-trips for fetching the same content repeatedly. HTTP defines semantics for a client to query web server to see if the content associated with some uniform resource locator (URL) or other reference has changed. In HTTP/1.0, such a query is known as an "If-Modified-Since" request because the client specifies the date when it last downloaded a copy of the content. By contrast, HTTP/1.1 uses "If-Match" with opaque identifiers called eTags. In both cases, a client that has some local copy of the document in the cache may query to see if that existing copy can be used. The server decides to serve new content (i.e., indicating that the version in the cache is stale) or returns "Not Modified" implying that the client may use its cached copy.

Figure 1:
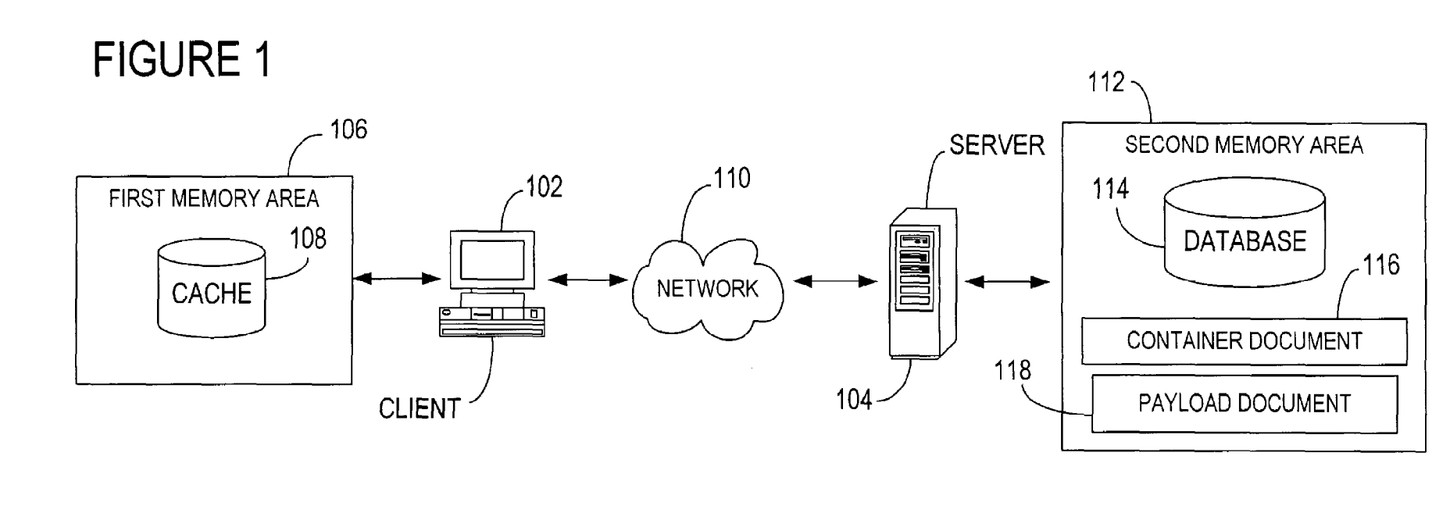
FIG. 1 is an exemplary block diagram illustrating the communication flow between a client and a server according to the invention.

Referring first to FIG. 1, an exemplary block diagram illustrates the communication flow between a client 102 and a server 104 according to the invention. The client 102 has access to a first memory area 106 such as a cache 108 to store temporary copies of content obtained during communication with the server 104. The client 102 communicates with the server 104 across a network 110 (e.g., wide area network 198 in FIG. 6) using, for example, a stateless protocol with request-response semantics such as HTTP. The server 104 has access to a second memory area 112 such as a database 114 or other memory area storing content such as a container document 116 and a payload document 118 to be delivered to the client 102 in response to requests for such content from the client 102. According to the invention, the server 104 stores state information in the database 114 or other memory area relating to the communication session between the client 102 and the server 104. For example, the database 114 may include a table that records the number of visits by a particular client to the server 104. Alternatively or in addition, the server 104 may store state information as associated values such as "[unique token]→[username+counter]" in a registry. Upon subsequent visits, the counter is incremented. In another embodiment, the database 114 stores the number of requests for specific content received from the client 102.

The caching semantics of HTTP or other protocols may be used for state management. In one embodiment, the invention uses two documents for state management. One document (e.g., the container document 116) references the other document (e.g., the payload document 118 or the embedded or additional content). As such, the client 102 sends another request to server 104 for the additional content. For example, the first document may be web content that references additional content via a URL. In an HTTP example, the server 104 redirects the client 102 to the additional content. While rendering a cached web page does not require network access, fetching embedded content referenced from the cached web page involves interacting with the server 104. The container/payload relationship may be established in various ways including, but not limited to, the relationships shown in Table 1 below. The container document may also be the top-level document.

TABLE 1

Various Container/Payload Relationsnips.

| Container (HTML document) | Payload (embedded object) |
|---|---|
| Top-level document (TLD) | Meta refresh tag to another web page |
| TLD | Image |
| TLD | Frame |
| TLD | Inline frame |
| TLD | Image file |
| TLD | Sound file |
| TLD | Script includes, e.g., an HTML tag such as <SCRIPT src="URL"> |
| TLD | Java applet |
| Frame | Image, frame, meta-refresh etc-in all cases a frame can substitute for TLD as container |
| Inline frame | Image, frame, meta-refresh etc-in all cases inline frame can substitute for TLD as container |
| TLD | Cascading style sheet |
| TLD | XML Data Island |

In some of the embodiments above, the container and the payload exist at the same time inside the same window context. In contrast, embodiments employing meta-refresh depend on replacing the container with the payload such that the container and the payload never coexist. For example, a meta-refresh such as the following may be employed.

<META http-equiv="refresh" content="2; URL=http://www.pageA.net/">

The meta tag above sends a visitor to the URL in the tag after two seconds. In other embodiments, the timing may be set to zero seconds for an immediate transfer or thirty seconds or longer for delayed transfer.

In operation, software of the invention manages state information across a plurality of communication sessions between the client 102 and the server 104. Maintained state information includes any information related to the client 102 and/or the server 104. For example, state information includes, but is not limited to, a number of visits by the client 102 to particular web pages served by the server 104, a record of purchases made by the client 102 at a web site operated by the server 104, and an electronic shopping cart. Because state information may be complex and include information that is internal to a web application (e.g., a shopping cart for an ecommerce scenario), the state information is generally stored in the server-side database 114. In the server-side database 114 embodiment, the client 102 stores a unique identifier that indexes into the server-side database 114. The identifier is unique to each client 102. The server 104 may use the identifier to retrieve or modify actual state information in the database 114 on subsequent visits by the client 102 because the identifier does not change from session to session.

Figure 2:
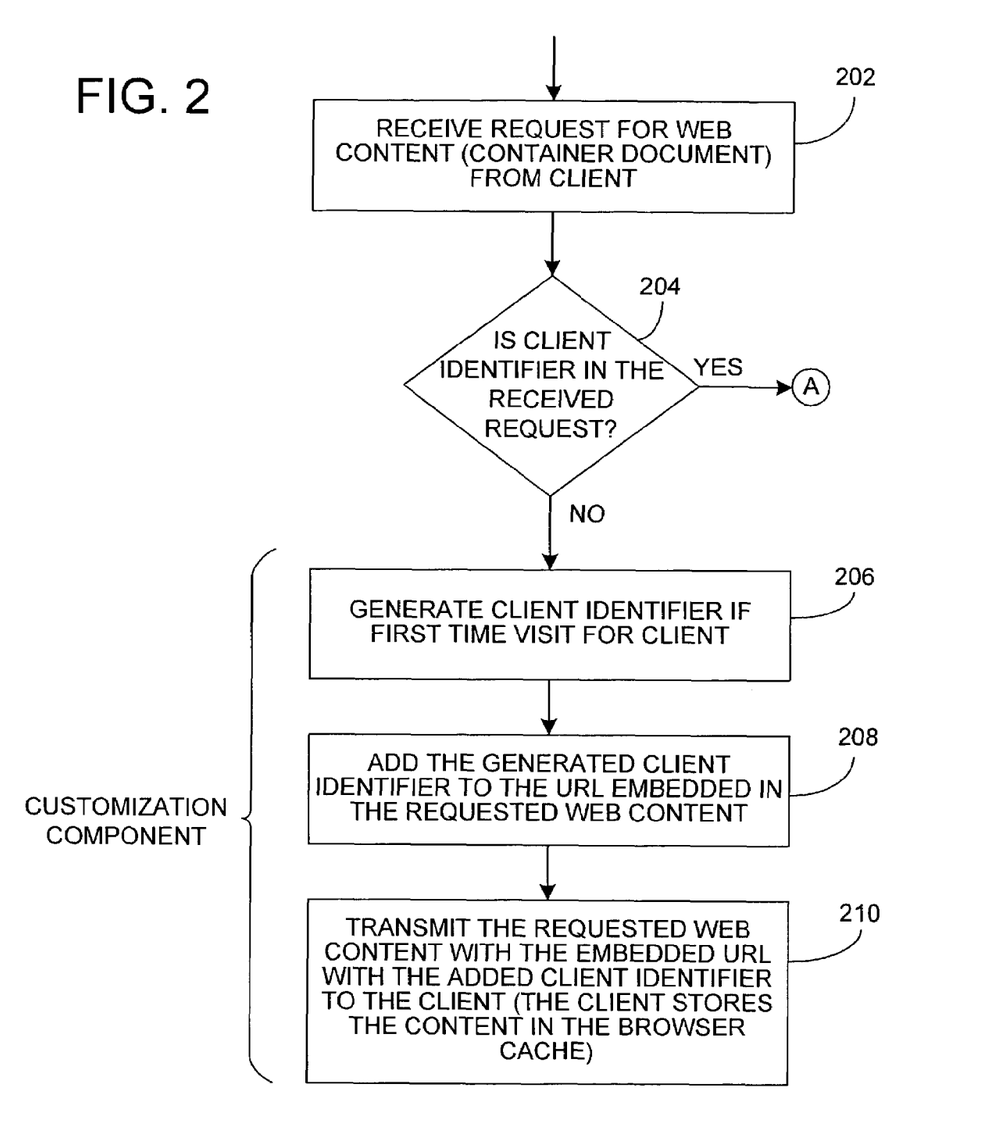
FIG. 2 is an exemplary flow chart illustrating operation of server software assigning a unique identifier to a client.

Referring next to FIG. 2, an exemplary flow chart illustrates operation of server software assigning a unique identifier to the client 102. Upon an initial visit to a web site operated by the server 104, the client 102 transmits a request to the server 104 for web content embodying the web site. The server 104 receives the request at 202, and examines the received request for a client identifier at 204. For example, the request may be a URL having a client identifier as a query string parameter in the URL. If the server 104 fails to identify a client identifier in the request for web content received from the client 102, the server 104 presumes that the client 102 is a first-time visitor to the web site and generates a client identifier for the client 102 at 206 via a computer-executable customization component of the server 104. The server 104 then associates state information related to the received request with the generated client identifier to enable state management. For example, the client identifier may be an alphanumeric string uniquely identifying the client 102. The server 104 creates a record, profile, or other data structure associated with the generated client identifier in the database 114. The created record stores state information obtained during the current communication session and future communication sessions.

In the invention, the web content (e.g., the container document 116) requested by the client 102 includes a reference or link to embedded content (e.g., the payload) hosted or otherwise accessible by the server 104 such as described above in Table 1. The server 104 modifies this reference to include the generated client identifier at 208. For example, if the reference or link to the embedded content includes a URL, the server 104 appends the client identifier as a parameter in a query string in the URL. Those skilled in the art will appreciate that other means of modifying the URL to include the client identifier exist and are applicable in the invention. The server 104 delivers or otherwise transmits the requested web content with the reference having the added client identifier to the client 102 at 210. The client 102 stores the delivered web content in the client browser cache 108. As such, the server 104 is unable to directly access the browser cache 108 using existing web browser software. In other embodiments, the client 102 receives the web content from the server 104 and stores the received web content as information that is inaccessible to the server 104. Storing the web content or container document 116 having the client identifier as server-inaccessible information (e.g., cached content) in a memory area (e.g., the client browser cache) provides greater security for the client identifier than using a memory area (e.g., a cookie jar) storing server-accessible information (e.g., a cookie). Cookies are accessible to the server 104, and hence subject to manipulation by the server 104, in that the client 102 automatically replays cookies to the server 104 when the client 102 navigates to the server 104. The client identifier is indirectly available to the container document 116 (e.g., via JAVASCRIPT) and directly to the payload content and all of its embedded content because the server 104 receives the full URL when servicing the request for the payload document 118. The relationships in Table 1 above and other similar relationships not specifically described herein allow for an object in the cache 108 (e.g., the container document 116) to store unique identifiers and emulate cookies.

According to one embodiment, the server 104 identifies the container document 116 having the added client identifier for long-term storage by the client 102. For example, the server 104 may assign long expiration or recent Last-Modified date to the container document 116. In contrast, the payload is marked as non-cacheable. For example, the server 104 may use the "Pragma: No-cache" header in version 1.0 of HTTP protocol or the "Cache-Control: no-cache; no-store" header in version 1.1 of HTTP. The outcome of this arrangement is that on subsequent visits, the client 102 obtains the cached copy of the container but always fetches a new copy of the payload.

In the HTTP embodiment, assignment of a client identifier occurs in several ways. In one method when the server 104 receives a request for the container document 116, the server 104 determines if the received request is an If-Match or If-Modified-Since request based on the HTTP headers. Responsive to the received If-Match or If-Modified-Since request, the server 104 returns a 302 Not Modified response. In this case, the client 102 has already visited the page before and has already been assigned an identifier.

If the received request is not an If-Match or If-Modified-Since request, the server 104 creates a new identifier string associated with the client web browser and creates a new entry in the database 114 keyed by the identifier for storing the state. The server 104 returns the container document 116 with one modification: the link to the payload is altered to include the newly generated identifier string. In one embodiment, the modification includes appending a query string parameter with the identifier to the hyperlink reference. When the server 104 receives a request for the payload (see FIG. 3), it extracts the identifier from the incoming URL specified by the client 102. This identifier keys the state information stored in the database 114.

Figure 3:
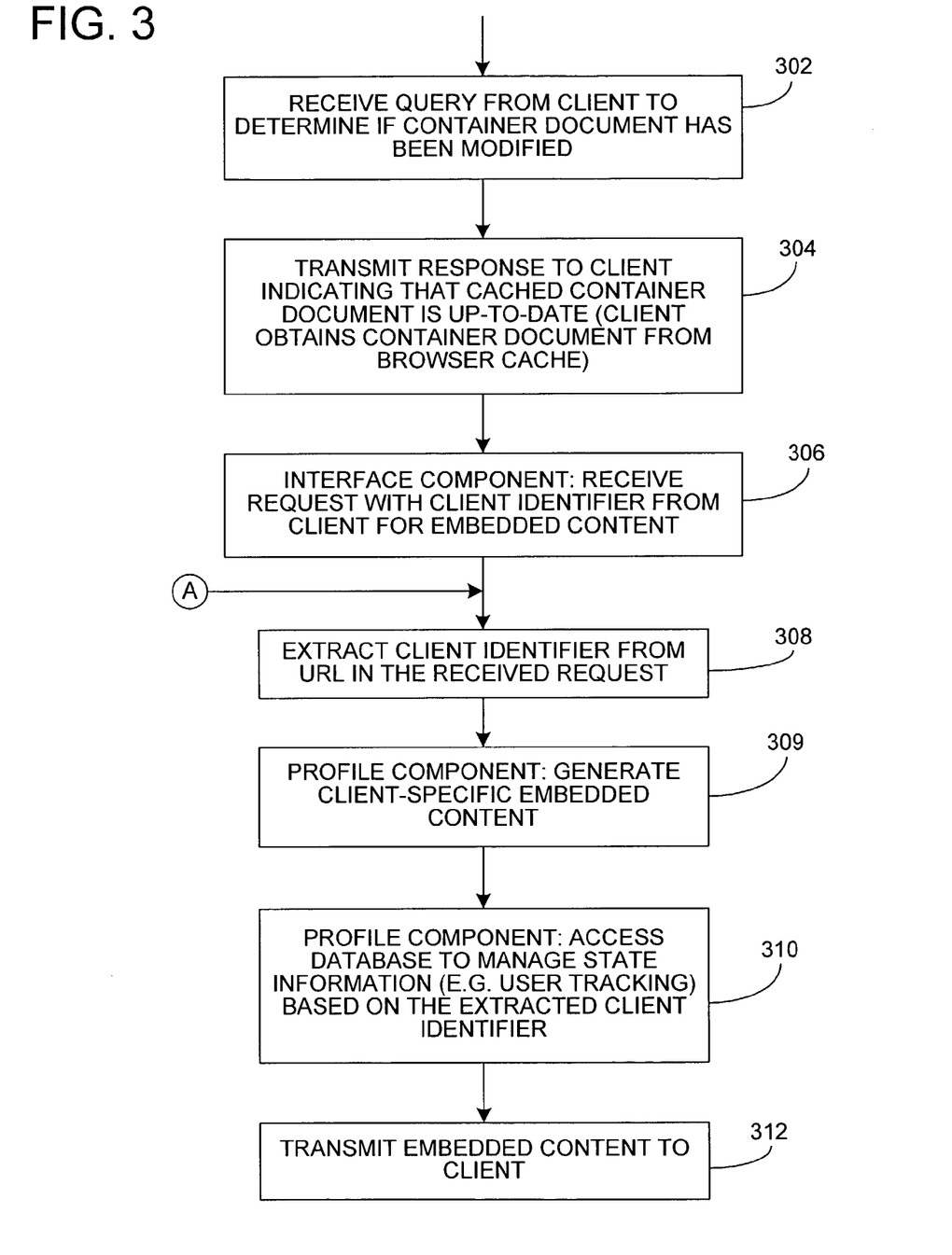
FIG. 3 is an exemplary flow chart illustrating operation of server software implementing state management.

Referring next to FIG. 3, an exemplary flow chart illustrates operation of server software implementing state management in a system in which the client 102 obtains web content from the first memory area 106 (e.g., the browser cache 108) in response to subsequent requests for the web content. The server 104 receives from the client 102 a query to determine if the web content (e.g., the container document 116) stored in the browser cache 108 differs from the web content stored by the server 104 at 302. The server 104 transmits a response to the client 102 indicating that the web content accessible or hosted by the server 104 has not changed at 304. As a result, the client 102 obtains the web content from the first memory area 106 (e.g., the browser cache 108).

As illustrated in FIG. 2, the web content stored in the browser cache 108 includes a reference to additional or embedded content stored in a memory area (e.g., the second memory area 112) accessible by the server 104. The reference includes the client identifier. To fully render the web content, the client 102 sends a request with the reference having the client identifier to the server 104. The server 104 receives the request from the client 102 for the additional content via an interface component at 306. The server 104 extracts the client identifier from the reference in the received request at 308. The server 104 executes a computer-executable profile component to generate the additional content at 309. The generated content is client-specific based on the extracted client identifier. The server 104 further employs the profile component to access the database 114 to manage the state information via the client identifier at 310. For example, the server 104 may add to, delete from, and/or otherwise edit or modify the state information. In addition, the server 104 delivers the requested additional content to the client 102 at 312.

Referring to FIG. 2 and FIG. 3, the functionality of the invention software may be embodied in various forms. According to one embodiment, one or more computer-readable media have computer-executable components for managing state information across a plurality of communication sessions between the client 102 and the server 104 as illustrated in FIG. 2 and FIG. 3. An interface component of the server 104 receives a request with a client identifier from the client 102 for the additional content hosted by the server 104 and/or stored in a memory area accessible to the server 104. A profile component of the server 104 accesses the database 114 to manage the state information via the received client identifier.

In an alternative embodiment, the obtained web content includes a web page capable of storage in a client browser cache (e.g., the first memory area). The web page includes a web bug referencing an image (e.g., the additional content stored in the second memory area) such as a 1×1 pixel image. The reference includes a client identifier. A web bug is also referred to as a clear or transparent graphics interchange format (GIF) image. In another embodiment, the obtained web content includes an email in HTML format (e.g., targeted spam) for storage in a client's inbox (e.g., the first memory area). The email includes a web bug referencing a client-specific image (e.g., the additional content stored in the second memory area) such as an advertisement. The reference includes a client identifier. Upon receiving the request for the additional content from the client 102, the server 104 generates the client-specific image based on the client identifier received in the request. The server 104 subsequently delivers the generated, client-specific image or other content to the client 102.

Figure 4:
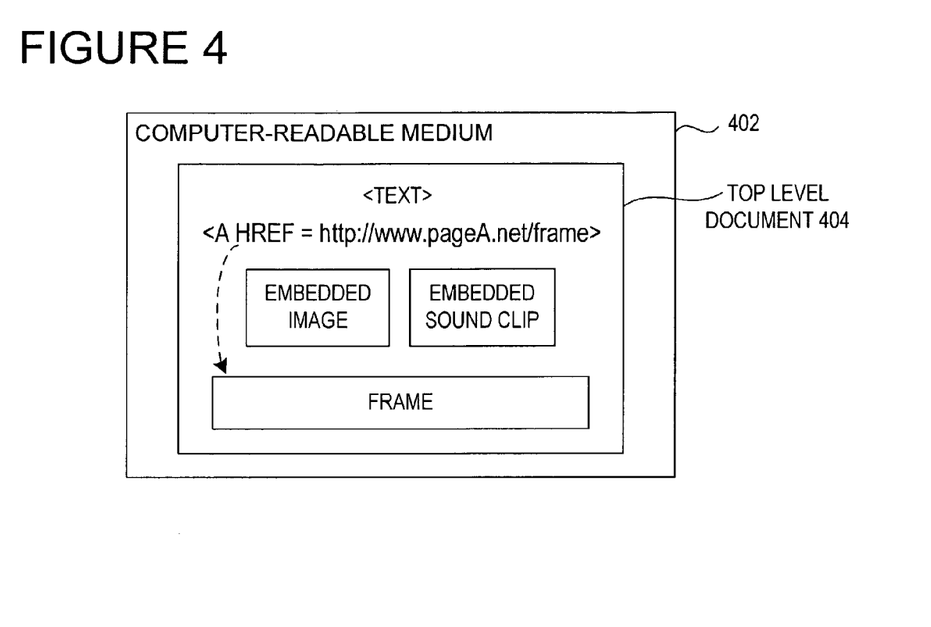
FIG. 4 is an exemplary block diagram illustrating a top-level document having various embedded objects.

Referring next to FIG. 4, an exemplary block diagram illustrates a computer-readable medium (CRM) 402 storing a top-level document (TLD) 404 or the container document 116 such as an HTML document having various embedded objects. The exemplary TLD 404 of FIG. 4 includes text, an embedded image, an embedded sound clip, and an embedded frame. The code underlying the TLD 404 includes a reference or other link or hyperlink to the embedded objects. In the example of FIG. 4, CRM 402 is the second memory area 112 in FIG. 1 wherein the TLD 404 has not yet been modified to include the client identifier. As discussed above, the server 104 modifies the reference to include the client identifier before sending the TLD 404 to the client 102 for long-term caching.

In particular, a computer-readable medium such as CRM 402 stores a data structure representing web content (e.g., TLD 404) customized for the client 102. The server 104 uses the data structure in managing state information across a plurality of communication sessions between the client 102 and the server 104. The data structure includes a first field storing web content. In the example of FIG. 4, the first field includes the text. The data structure also includes a second field within the first field storing a reference to additional content. The server 104 modifies the reference to include the client identifier. The server 104 sends the client 102 the data structure for long-term storage as information inaccessible by the server 104. The client 102 subsequently requests the additional content from the server 104 via the reference in the second field. The server 104 associates state information regarding the client 102 with the client identifier received in the request for additional content and stores the associated state information.

Figure 5:
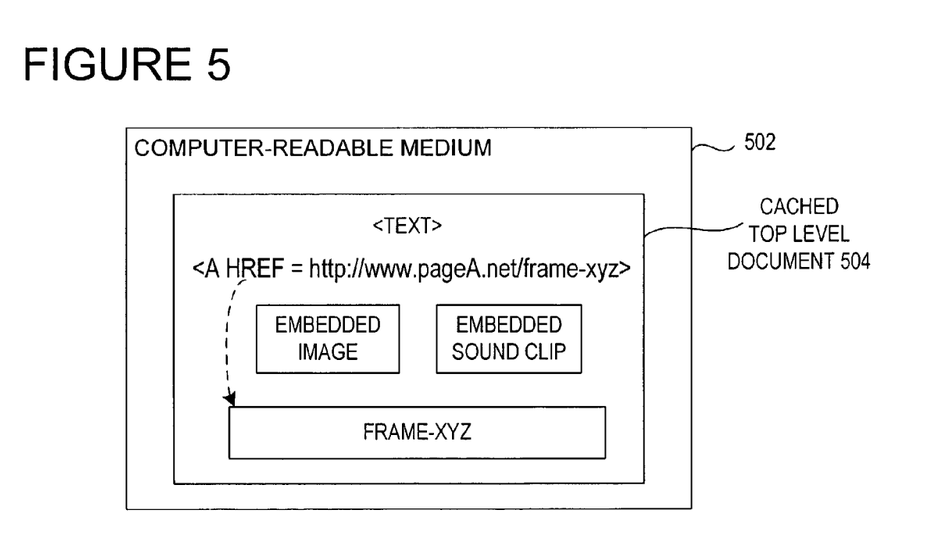
FIG. 5 is an exemplary block diagram illustrating a hyperlink with a client identifier providing a reference to additional content in a top-level document.

Referring next to FIG. 5, an exemplary block diagram illustrates a computer-readable medium (CRM) 502 storing a top-level HTML document 504 or the container document 116 having a hyperlink with a client identifier providing a reference to additional content. In this example, the server 104 has assigned the client 102 an identifier "XYZ". In addition, the server 104 has re-written the hyperlink in the TLD 504 to include the client identifier. The hyperlink references an inline frame via the URL with the client identifier. In this example, the text in TLD 504 is the same for all clients. However, the content in the frame is customized for each client 102 based on the client identifier (e.g., xyz). In this manner, the server 104 may present a standard web page to the client 102 along with some customized content such as a personalized greeting. In the example of FIG. 5, CRM 502 is the first memory area 106 in FIG. 1 such as the browser cache 108.

Figure 6:
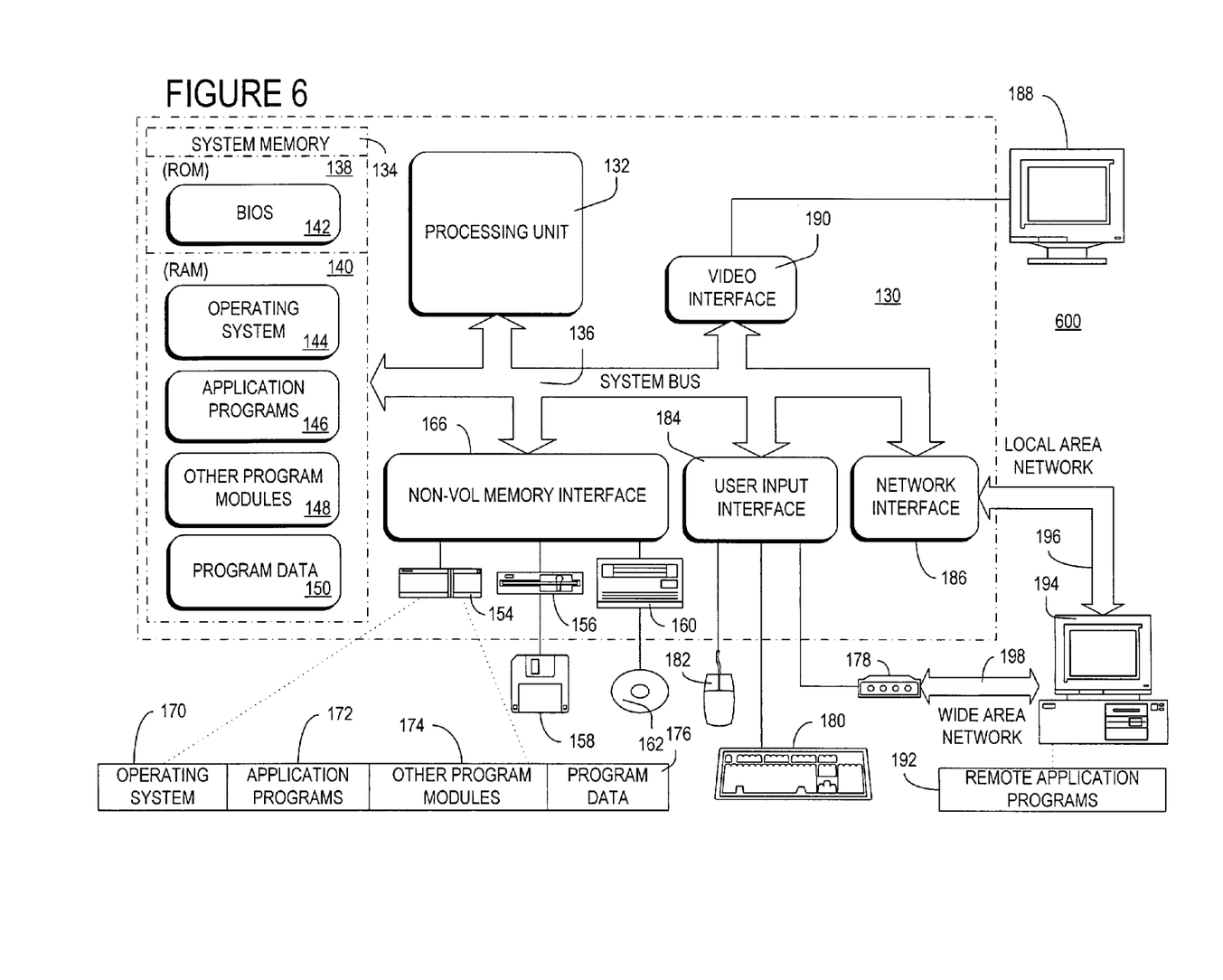
FIG. 6 is a block diagram illustrating one example of a suitable computing system environment in which the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a nonvolatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other data communication networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 2 and FIG. 3 to manage state information during communication sessions between the client 102 and the server 104.

Figure 7:
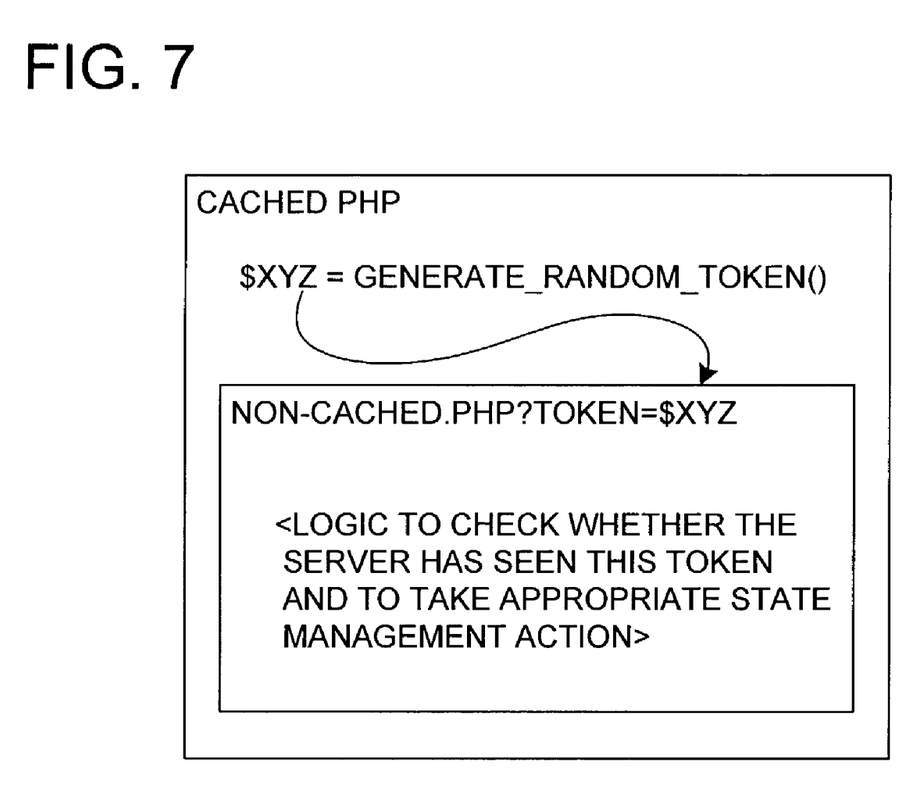
FIG. 7 is an exemplary block diagram illustrating a cached web page referencing a non-cached web page with the client identifier appended as a query string parameter.

Referring next to FIG. 7, the following example illustrates the invention. A web page cached by the client 102 includes a frameset that references a non-cached page. In this reference, the unique client identifier is passed on the query string as a parameter, and consequently, the server 104 has an opportunity to perform some logic with the GET request for the non-cached page on the token. Exemplary hypertext pre-processor pseudocode entitled "cached.php" is shown below for operation of the server software as illustrated generally in FIG. 2 with reference to FIG. 7.

```
<script>
If (received If-Modified-Since request) then
    return "HTTP/1.1 304 Not Modified"
    exit
End If
// According to HTTP RFC, setting page expiry to 1
// year is equivalent to setting it to live forever.
set_page_expiry(1 year);
$XYZ = generate_random_token( );
</script>
<HTML>
<FRAMESET>
    <FRAME SRC="non-cached.php?token=$XYZ">
</FRAMESET>
</HTML>
```

The set_page_expiry( ) command identifies the container document 116 for long-term caching. The generate_random_token( ) routine generates a unique client identifier for the user. The FRAMESET tag includes the hyperlink with the generated client identifier referencing the payload content.

Hypertext pre-processor pseudocode entitled "non-cached.php" is shown below and is illustrated generally in FIG. 3 with reference to FIG. 7. The script is generated by the server software and sent to the client 102 as the non-cached content (e.g., the additional content).

```
<script>
// ensure this page is not cached
set_last_modified_date(now)
set_page_no_cache(true)
// remember $token is received on query string
If ($token not recognized)
    initialize_counter( );
Else If ($token is recognized) {
    increment_counter( );
}
// display welcome message with new counter value
print ("You've been here ");
print_counter( );
print (" times. Thanks for visiting again!");
</script>
```

The set_modified_date( ) and set_page_no_cache( ) commands identify the payload content as non-cacheable content. In this example, the server 104 manages state information by updating a counter indicating the number of visits or requests by the client 102 for the payload document 118 via increment_counter( ), displaying the name of the client 102 to the client 102 via print_name( ), and displaying the number of visits or requests by the client 102 to the client 102 via print_counter.

Unless otherwise noted, the example companies, organizations, products, domain names, uniform resource locators, e-mail addresses, logos, people, places and events depicted herein are fictitious, and no association with any real company, organization, product, domain name, e-mail address, logo, person, place or event is intended or should be inferred.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method comprising:
   receiving, at a server, a request from a client for web content embodied in a web site associated with the server, said sewer being coupled to a data communications network, said client having a first memory area that is inaccessible to the server, said first memory area comprising a client browser cache;
   generating a client identifier in response to the received request, said client identifier being specific to the client across a plurality of communication sessions between the client and the sewer;
   associating state information related to the received request with the generated client identifier in a database for enabling state management across the plurality of communication sessions between the client and the server, said database being stored in a second memory area that is accessible to the server;
   identifying the web content embodied in the web site, said web content including client-cacheable web content and non-client-cacheable web content, said client-cacheable web content including a reference to the non-client-cacheable web content, said non-client-cacheable web content being stored in a third memory area that is accessible to the server;
   adding the generated client identifier to the reference included in the client-cacheable web content;
   delivering the web content embodied in the web site to the client, said delivered web content including the client-cacheable web content with the reference having the added client identifier, wherein the client stores, upon receipt, the client-cacheable web content of the delivered web content as information in the client browser cache that is inaccessible to the server;
   receiving, at the server, a subsequent request from the client for the non-client-cacheable web content stored in the third memory area, the received subsequent request including the reference to the non-client-cacheable web content having the added client identifier;
   generating the non-client-cacheable web content, said non-client-cacheable web content being client-specific based on the received client identifier;
   accessing the database in response to the received client identifier to manage the state information; and
   generating a client redirect in response to the received, subsequent request, wherein the client retrieves the non-client-cacheable web content from the third memory area responsive to the client redirect.

2. The method of claim 1, further comprising:
   receiving, from the client, a query to determine if the client-cacheable web content accessible by the server has changed; and
   delivering a response to the client indicating that the client-cacheable web content accessible by the server has not changed, wherein the client obtains the client-cacheable web content from the first memory area.

3. The method of claim 1, wherein accessing the database comprises accessing the database to add state information or delete state information or both in response to the received client identifier.

4. The method of claim 1, wherein the reference to the non-client-cacheable web content comprises a hyperlink to a location on the data communication network.

5. The method of claim 1, wherein the web content in the first memory area includes a hypertext markup language (HTML) document, wherein the reference comprises a hyperlink to a location on the data communication network, and wherein the non-client-cacheable web content is accessible by the client from within the HTML document via the hyperlink.

6. The method of claim 1, wherein the server and the client communicate via a stateless protocol having request-response semantics.

7. The method of claim 1, wherein one or more computer storage media have computer-executable instructions for performing the method recited in claim 1.

8. One or more computer storage media having computer-executable components the components comprising:
   an interface component for coupling a server to a data communication network, wherein a client is coupled to the data communication network, said interface component receiving a first request from a client for web content embodied in a website, said web content including client-cacheable web content and non-client-cacheable web content, said client-cacheable web content including a reference to said non-client-cacheable web content;
   a customization component for generating a client identifier in response to the interface component receiving the first request from the client for the web content embodied in the website, adding the generated client identifier to the reference included in the client-cacheable web content, and transmitting to the client the web content including client-cacheable web content having the reference with the added client identifier, wherein the client caches the transmitted client-cacheable web content in a client browser cache that is inaccessible to the server; and
   wherein the interface component receives a subsequent request for the non-cacheable web content from the client, said subsequent request including the reference to the non-cacheable content having the generated client identifier;

a profile component for generating the non-client-cacheable web content, said non-client-cacheable web content being client-specific based on the client identifier, said profile component further accessing a database in response to the received client identifier to manage state information as a function of the client identifier across the plurality of communication sessions between the client and the server, wherein the sewer generates a client redirect in response to the subsequent request received by the interface component, and wherein the client retrieves the non-client-cacheable web content generated by the profile component from a memory area accessible to the sewer responsive to the client redirect.

9. The computer storage media of claim 8, wherein the reference to non-client-cacheable web content comprises a hyperlink to a location on the data communication network.

10. The computer storage media of claim 8, wherein the client-cacheable web content cached in the client browser cache includes a hypertext markup language (HTML) document, wherein the reference comprises a hyperlink to a location on the data communication network, and wherein the non-client-cacheable web content is accessible by the client from within the HTML document via the hyperlink.

11. The computer storage media of claim 8, wherein the server and the client communicate via a stateless protocol having request-response semantics.

12. A computer storage medium having stored thereon a data structure representing web content customized for a client, said client and a sewer being coupled to a data communication network, the data structure comprising:
  a first field caching client-cacheable web content embodied in a client requested web site; and
  a second field, within the first field, caching a reference to non-client-cacheable web content embodied in said client requested web site, the reference including a client identifier specific to the client across a plurality of communication sessions between the client and the sewer, wherein, responsive to a first request by the client for the website, the sewer generates the client identifier and adds said generated client identifier to the reference and sends the client the data structure for storage as information in a memory area, said memory area being a client browser cache that is inaccessible to the server, wherein the client subsequently requests the non-client-cacheable web content from the server via the reference including the client identifier, wherein the sewer generates the non-client-cacheable web content from content stored in another memory area that is accessible to the server, said additional web content being client-specific based on the client identifier, wherein the server associates state information regarding the client with the client identifier received in the request for the non-client-cacheable web content and manages the associated state information across the plurality of communication sessions between the client and the server, and wherein the sewer generates a client redirect by which the client retrieves the non-client-cacheable web content.

13. The computer storage medium of claim 12, wherein the first field comprises a hypertext markup language (HTML) document.

14. The computer storage medium of claim 12, wherein the second field comprises a hyperlink to a location on the data communication network.

15. The computer storage medium of claim 12, wherein the second field stores a reference to one or more of the following: a frame, an inline frame, an image file, a sound file, a script, an applet, a cascading style sheet, an extensible markup language data island, and text.

16. The computer storage medium of claim 12, wherein the data structure is represented as a hypertext markup language (HTML) document.

* * * * *

UNITED STATES PATENT AND TRADEMARK OFFICE
CERTIFICATE OF CORRECTION

PATENT NO. : 7,634,570 B2 Page 1 of 1
APPLICATION NO. : 10/425516
DATED : December 15, 2009
INVENTOR(S) : Paya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 983 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,634,570 B2 | Page 1 of 1 |
| APPLICATION NO. | : 10/425516 | |
| DATED | : December 15, 2009 | |
| INVENTOR(S) | : Ismail Cem Paya et al. | |

It is certified that error appears in the above-identified patent and that said Letters Patent is hereby corrected as shown below:

In column 13, line 35, in Claim 1, delete "sewer" and insert -- server --, therefor.

In column 13, line 42, in Claim 1, delete "sewer;" and insert -- server; --, therefor.

In column 15, line 8, in Claim 8, delete "sewer" and insert -- server --, therefor.

In column 15, line 13, in Claim 8, delete "sewer" and insert -- server --, therefor.

In column 15, line 29, in Claim 12, delete "sewer" and insert -- server --, therefor.

In column 16, line 1, in Claim 12, delete "sewer," and insert -- server, --, therefor.

In column 16, line 3, in Claim 12, delete "sewer" and insert -- server --, therefor.

In column 16, line 10, in Claim 12, delete "sewer" and insert -- server --, therefor.

In column 16, line 20, in Claim 12, delete "sewer" and insert -- server --, therefor.

Signed and Sealed this
First Day of February, 2011

David J. Kappos
*Director of the United States Patent and Trademark Office*